United States Patent Office 2,976,722
Patented Mar. 28, 1961

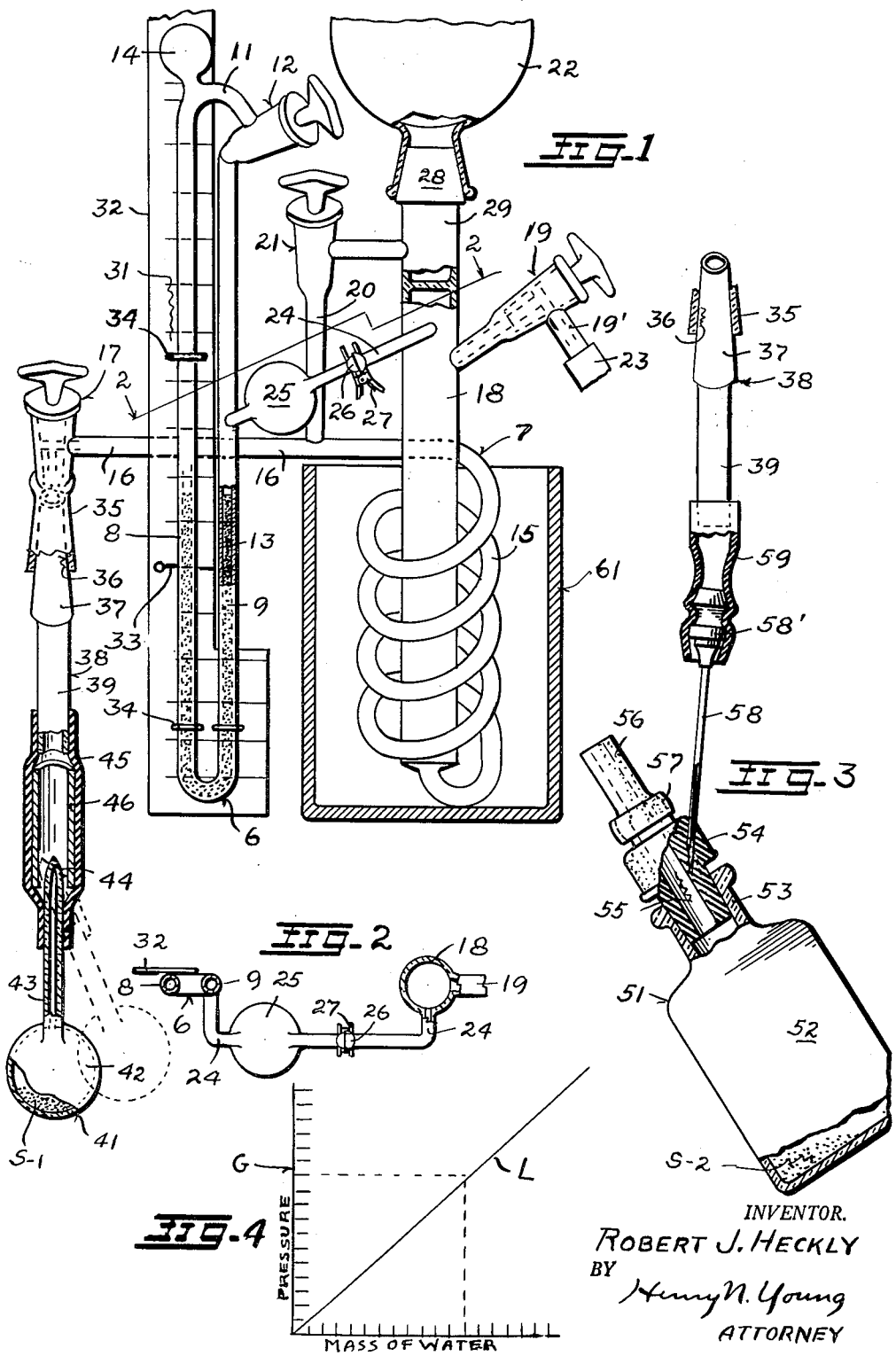

2,976,722
WATER-CONTENT TESTING DEVICE
Robert J. Heckly, 1156 Oxford St., Berkeley, Calif.
Filed Oct. 22, 1956, Ser. No. 617,631
6 Claims. (Cl. 73—76)

The invention relates to a method and means for ascertaining the moisture content of materials, and particularly of organic materials.

For ascertaining the moisture content of samples of various organic or inorganic materials or products, the devices heretofore known to me in the art have involved more or less complicated formulas requiring pluralities of readings and computations which are subject to human error. In accordance with the present invention, the device of interest utilizes a novel unitary apparatus which requires only a single reading which may be directly interpreted from a reference graph for the apparatus to provide the required information with particular accuracy, whereby to accomplish a primary object of the invention.

Another object of the invention is to provide a testing device of the character described which requires a minimum amount of apparatus for providing particularly accurate determinations.

A further object is to provide an apparatus of a closed-circuit evaporation type which may be successively and accurately used for determining the moisture content of specimens from many different sources.

Yet another object is to provide a device of the character described which does not destroy the biological activity and/or modify the chemical composition or relations of a sample under test.

An added object is to provide a particularly simple and reliable means for connecting a sample provided in a sealed container with the space of the apparatus without an interim exposing of the sample to the atmosphere.

A still further object is to provide a particularly simple and effective means for degassing in place of the liquid charge of a U-tube manometer of the apparatus.

The invention possesses other objects and features of advantage, some of which, with the foregoing, will be set forth or be apparent in the following description of a typical embodiment thereof, and in the accompanying drawings, in which Figure 1 is an elevation of an apparatus embodying the features of my invention, portions of the structure being shown in section.

Figure 2 is a fragmentary sectional view taken from the line 2—2 in Figure 1.

Figure 3 is a partly sectional elevation illustrating a means alternative to that shown in Figure 1 for connecting a sample with the apparatus.

Figure 4 illustrates a typical conversion graph for use with reference to a present apparatus.

For carrying out the purposes of my invention in a particularly simple and effective manner, I utilize a U-tube manometer 6 which has its space above the gauging liquid connected to a space provided in part by a heat exchanger 7 to provide a closed expansion space for the vaporized moisture from a sample or specimen being tested with the apparatus. Preferably, and as shown, the legs or sides 8 and 9 of the manometer tube are connected at their top by a tube 11 having a stopcock 12 interposed therein for its closing to prevent a flow of gaseous material between the spaces of the manometer above the gauging liquid 13 in the legs thereof when a manometer pressure reading is desired; as shown, the connection 11 includes an expansion bulb 14 of relatively small capacity.

In the present structure, the heat exchanger 7 comprises an upright helical coil 15 having a terminal tube 16 extending more or less horizontally to a stopcock 17, while the other coil end is connected to an upright tube 18 having a stopcock 19 connected to it above the level of the tube 16 and arranged to connect the tube 18 with a gas-exhausting means. A branch tube 20 extends upwardly from the tube 16 through a stopcock 21 through which the tube 16 may be connected to the space of a container comprising a flask 22 of relatively large capacity, and a tube 24 connects the tube 18 with the manometer leg 9. The present stopcocks or valves 12 and 17 and 19 and 21 are all shown as of the same general type, with each having a single right-angle side connection to a conically tapered ground seat provided in a body which mounts a complementary hollow conical rotary stopper or plug engaging the seat and operative to connect a side body port with a tube connection at the smaller end of the seat bore.

It will now be noted that the tube 24 slopes downwardly from an upper point of the tube 18 to a supporting connection of the tube with the manometer at its leg 9 through an intermediate bulb 25 which is positioned and arranged to function as a liquid trap to prevent the accidental escape of the manometer liquid through the tube 24 during an evacuation of the apparatus space through the exhaust valve 19. Preferably, and as shown, the portion of the tube 24 between the bulb 25 and the tube 18 has a sealed ball-and-socket (spherical joint) connection 26 provided therein, whereby a flexible seal connection is provided thereat while a suitable clamp 27 releasably holds the ball and socket portions of the connection in mutually engaged relation to effect the support of the manometer 6 from the tube 18 which may be directly carried on a suitable standard or bracket.

The side connection 19' of the stockcock 19 is relatively short and is engaged in a flexible tube 23 which is arranged for its connection with a suitable suction pump means (not shown) for exhausting the gaseous contents of the otherwise closed apparatus space with a corresponding reduction of the pressure therein to a predetermined value approaching zero while the stopcock 12 is open. If the stopcock 12 is closed as the desired low pressure condition is attained, the manometer 6 will indicate the attained low pressure in the apparatus space. In this manner, a relatively low and desired sub-atmospheric pressure may be provided in the closed space of the apparatus as conditioning it for use with material to be tested for its water content.

The present container 22 has a usual laboratory-flask structure having a belled mouth for complementarily and sealedly receiving a plug 28 provided at the end of a rigid tube section 29 having the tube 20 extending from its side. As particularly shown, the tube section 29 comprises an integral sealed-off extension of the tube 18 whereby a flask 22 of desired capacity may be conveniently and replaceably mounted in fixed sealed relation in the unitary apparatus combination. For a reason to be hereinafter brought out, a flask 22 is of relatively large capacity for its elective use in the apparatus in accordance with the expansion space needed to obtain manometer readings for ascertaining the moisture content of larger or moister samples.

Understanding that a measurement of pressure by the manometer 6 is ascertained as the difference between the simultaneous readings of the liquid column heights in the legs 8 and 9, a means is preferably provided for ascertaining the column level difference by a single reading, whereby to minimize the chances of error in reading the manometer indications. Accordingly, and as illustrated, a suitable scale 31 is delineated on a plate member 32 which is slidably mounted on the manometer tube for its vertical adjustment therealong. Near its bottom, the scale 31 provides a zero line 33 for registration with the pressure-positioned top of the liquid column in the leg 9, whereby a reading of the scale portion opposite the top of the liquid column in the leg 8 directly provides the pressure readings of the manometer. As particularly illustrated, the scale-carrying plate 32 provides eyes 34 which slidably receive the manometer legs 8 and 9 to permit guided adjustments of the member 32 along the manometer legs to provide the single pressure reading to be taken.

It will now be particularly noted that the stopcock 17 is arranged for the initially sealed-off connection to the apparatus thereat of suitable containers for samples to be tested. As particularly shown, the body of this stopcock is provided with an axial extension 35 providing a conically flared bore 36 coaxial with its plug and having a ground surface for complementary and sealed engagement by a tapered connecting plug 37 provided at one end of a tubular connecting adapter 38 having a stem portion 39 of external uniform section to which a suitable container for a test sample is arranged to be attached while sealedly enclosing a sample and before the apparatus space is exhausted for making a test.

As particularly shown in Figure 1, a container 41 enclosing a sample S-1 comprises a glass phial having a hollow globate portion 42 from which a nozzle tube 43 extends to a pointed tip 44 which has been sealed off under known temperature and pressure conditions with respect to the sample, the sealed-in weight of which is desirably known. After a sample has been sealed in a container 41, the tip portion 44 of its tube 43 is sealedly inserted within one end of a flexible tube 45 which intermediately and interiorly carries a rigid tubular element 46 having its bore large enough to axially receive the break-off tip portion 44 of the nozzle 43 for such a distance within the tube 46 that a relative angular rocking of the nozzle 43 and the tube 46 to forcibly engage the tip with the inside of the tube 46 by appropriately flexing the tube 45 will break off the nozzle top 44. having the assembly 45—46 mounted on the bottle nozzle 43 in the aforesaid manner and relation, the other end of the flexible tube 45 is engaged on and about the free end portion of the connector part 39, whereby the sealed container 41 is sealedly and replaceably connected with the stopcock 17 before it is opened by breaking off its tip 44 within the element 46.

As particularly illustrated in Figure 3, an adapter connector 38 having a plug 37 and stem 39 is utilized for connecting with the portion 35 of the stopcock 17 an initially sealed bottle 51 containing a sample S-2. The present bottle 51 has a body portion 52 from which a tubular neck 53 extends for sealedly receiving a rubber cork 54 or plug 54. The cork 54 has a longitudinal bore 55 therethrough which traverses a reduced tubular outer extension 56 of the cork, and the bore portions of the plug extension 56 is arranged to be sealed off, as by the flattening application of a clamp band 57 thereto after the sample has been placed in the bottle and the cork fully applied. In the present case, the connection of the sample bottle cavity with the adapter 38 is arranged to be effected by the impaled entry of a tubular needle 58 into the cork 54 from its outer end for the projection of the open needle point into the cork bore 55 only after the passage of the needle has been sealedly connected with the passage of the adapter 38 and the adapter has been attached to the stopcock 17. The needle 58 may conveniently be of the type used for making hypodermic injections, and has its base portion 58' sealedly engaged in one end of a flexible rubber tube 59 having its other end sealedly receiving the stem 39 of the adapter 38 by which the needle and the engaged container 51 may be mounted on the stopcock 17.

For using a present apparatus for its purposes, a suitable open-top vessel 61 may be provided for containing an appropriate heating or cooling bath for application to the heat exchange coil 15 as required during the use of the apparatus, and the same or other suitable vessel (not shown) may be provided for an appropriate similar use at the connected sample container 41 or 51. Also, the mass of the sample must be known so that the ascertained mass of vapor extracted therefrom in the apparatus may be related to the mass of the sample.

In general reference to the method of use of the described appaartus, it will be noted that the same is utilized under the principle that a mass of vapor expanding into a closed gas-free space of known capacity will acquire a pressure which is directly proportional to its mass. Understanding that the manometer 6 must provide an accurate pressure reading for the expansion space provided by the present apparatus, an oil is used as the manometer liquid to provide greater pressure differential manometer readings than would be provided by mercury therein. Since the oil of a charge 13 thereof placed in the manometer 6 would usually contain volatile fractions and/or some water, it is necessary that the charge be in degassed condition before the manometer is used, and it is important to note that the present apparatus provides for a degassing of the oil charge after it is placed in the manometer, whereby a degassed condition of the oil may be maintained during repeated uses of the unit. For effecting a degassing of the installed oil charge 13, the entire sealed-in space of the system is evacuated of all gas through the stopcock 19 to a pressure of the order of 50 microns of mercury with the stopcocks 12 and 21 open, then, while the evacuation process is continued, the arm 8 of the manometer 6 is heated, as by a Bunsen burner, to boil the oil over through the stopcock 12 to run down the manometer side 9 to the top of the oil column therein to provide for an evacuation escape of any freed vapors through the tube 24 and so from the enclosed space of the apparatus, after which the stopcock 12 is closed to provide for the application of the space pressure solely at the top of the liquid column in the manometer leg 9, while sealing off the manometer space between it and the top of the liquid in the manometer leg 8.

A moisture content determination for a sample or specimen by the use of the present apparatus is carried out by the following steps:

(1) A container enclosing a sample to be tested is attached to the apparatus at the adapter 38 in the described manner and in sealed condition, it being understood that the present sample containers 41 and 51 and the different devices for opening them while so attached are representative of other sample containers which might be utilized with the apparatus.

(2) Having the stopcock 19 connected to a suitable evacuation means, it is opened for a removal of air and water vapors from the entire apparatus space defined beyond the closed point of the sample container while the stopcock 12 is closed and the stopcocks 17 and 21 are open.

(3) The heat exchanger 7 is immersed in a Dry-Ice and ethanol bath after practically all air and water have been removed from the closed space as may be indicated by a reading of about 50 microns on a Pirani gage in the suction line, or by the return of the manometer pressure indication to virtually zero.

(4) After the heat exchanger 7 (condenser) has acquired the desired temperature, the space of a sample container 41 or 51 is connected with the evacuated apparatus space, as by breaking off the phial tip 44, or by advancing the installed needle 58 in the plug 54 to connect its duct with the plug bore 55 respectively, or suitably opening an attached other sample container, for an evaporation of the water from the sample into the apparatus space and its condensation in the heat exchanger 7.

(5) The water vapor from the connected sample flows from a phial 41 at room temperature into the cold heat exchanger, or the water vapor from a larger sample in the container 51 is evaporated in a warming water bath for the container. Since the amount of water that can be removed from a dried sample is correlated with the temperature, the latter should be carefully controlled. Although a temperature of 100° C. may not denature dry proteins or kill microorganisms, it is safer to use a lower temperature, such as 50° or 60° C., in order to retain the biological activity of the sample for its possible subsequent other use.

(6) After the stopcocks 17 and 19 have been closed, the condensed water is vaporized by removing the heat-exchanger (condenser) from the cooling bath and placing it in water at room temperature. Although small variations in temperature produce only negligible effects on the indicated pressure, the use of a constant temperature is recommended.

(7) When the stopcock 21 of the illustrated apparatus combination is left closed, 1 cm. of oil pressure is equivalent to approximately 0.1 mg. of water. Should the amount of water from the sample be sufficient to produce a vapor pressure in excess of 25 cm. of oil (about 3 mg. of water), the volume of the vapor space of the apparatus may be increased by opening the stopcock 21 to include the space of the flask 22 in said space; if, for instance, a 1000-ml. flask 22 is used, 1 cm. of oil will be equivalent to about 1 mg. of water. When the temperature of the apparatus has reached equilibrium, as indicated by a constant manometer reading, this pressure reading may be translated into the corresponding water mass by direct reference to a suitable tabulation or graph based on the apparatus constants.

Recalling that water-content determinations with the present apparatus are arranged to be ascertained by the reference to a single tabulation of a single final manometer pressure reading, it has been found that such readings may be conveniently referred directly to a graph in which manometer pressures of the apparatus in centimeters of oil may yield water-content readings in milligrams under predetermined physical conditions of and in the apparatus. Such a graph G is shown in Figure 4, and its straight reference line L is found by using a given apparatus combination with different known amounts of water in different samples. All content determinations having been made under the same apparatus conditions for a given manometer pressure P, the mass W (in milligrams) of water in a tested sample S may be directly ascertained with required accuracy by the use of the following formula providing the graph line L of Figure 4 and having its symbols identified thereafter:

$$W = P \times (V + P \times M) \frac{273 \times 18 \times 10 \times D_0}{T \times 22.4 \times 760 \times D_{Hg}} \text{ or}$$

$$\frac{.2887 \times P \times D_0 \times (V + P \times M)}{T \times D_{Hg}}$$

| Symbol | Unit | Measure |
| --- | --- | --- |
| W | mg | mass of water in sample. |
| P | cm | oil manometer pressure reading. |
| V | ml | volume of apparatus test space at zero pressure reading. |
| M | ml | oil volume displaced per centimeter pressure. |
| T | C° | absolute temperature of apparatus and its closed space. |
| $D_0$ | gm./ml | density of the manometer oil at temperature T. |
| $D_{Hg}$ | gm./ml | density of mercury (Hg) at temperature T. |

The described apparatus may also be used to determine the pressure within a closed sample container as comprising an intermediate step in a moisture determination. To do this, the exhaust line stopcock 19 is closed before the connection between the sample and the apparatus is completed under Step 3. The pressure within the sealed container is directly related to the gauged lower pressure produced in the expansion space after its connection to the container space, and may be obtained from a conversion graph provided from an appropriate formula based on the apparatus characteristics and corresponding to that provided and used to obtain the graph G relating to the amount of water in the sample.

It will be understood that the described apparatus may be fully readied for the next determination with it merely by opening the stopcock 19 and trapping the test charge of water vapor from the expansion space in a condenser (not shown) provided in the vacuum line 23 to the operating exhaust means. In view of the present disclosures respecting it, it will be further understood that the present relatively simple moisture-testing apparatus is particularly effective for accomplishing the objectives of its design, particular reference being made to the provision for the repeated degassing of the manometer liquid in the space. The means provided for eliminating any need for a subtraction of readings for obtaining a pressure reading from the manometer, and the disclosed devices for connecting enclosed samples with the expansion space of the apparatus without exposing the samples to the atmosphere.

From the foregoing description taken in connection with the accompanying drawings, the advantages of the present water-content testing device will be readily understood by those skilled in the art to which the invention appertains. While I have shown and described a structure and arrangement which I now consider to be a preferred embodiment of my invention, I desire to have it understood that the showings are primarily illustrative, and that such changes and developments may be made, when desired, as fall within the scope of the following claims.

I claim:

1. The method of ascertaining the moisture content of a test body of a material which is subject to composition changes under higher than normal temperature conditions therefor, which comprises sealedly enclosing the body of material in a container at a normal temperature for the material, sealedly connecting the container space with a closed exhausted evaporation space for the evaporation escape of moisture from the body into the space while the temperature of the body is thereafter maintained at substantially its initial temperature, effecting a condensation in said closed evaporation space of the vapor received therein from the body, sealing off the evaporation space from the container space, re-evaporating the condensate in the evaporation space, and gauging the resulting vapor pressure in said space as indicating the mass of the moisture evaporated from the body.

2. The method of ascertaining the moisture content of a weighed sample of material while the temperature of the sample is maintained at a substantially normal value thereof with respect to the material, which comprises sealedly enclosing the sample in a container, connecting the container space with a sealed substantially fluid-free space for the evaporation of the moisture of the sample into the space under complete vaporizing conditions for the moisture from the sample, effecting a condensation in said closed evaporation space of the vapor received therein from the sample, sealing off the evaporation space from the container space, re-evaporating the condensate in the evaporation space, and effecting a manometer gauging of the resulting vapor pressure in said evaporation space as being directly proportional to the mass of the moisture derived from the sample.

3. The method of ascertaining the moisture content of a weighed sample of material while the temperature of the sample is maintained at a substantially normal value therefor with respect to the material, which comprises sealedly enclosing the sample in a container, sealedly connecting the container space with a closed exhausted evaporation space for the evaporation escape of moisture from the sample into the latter space, effecting the condensation in said evaporation space of the vapor received therein from the sample to provide a condensate of the vapor therein, sealing off the evaporation space from the container space, re-evaporating the condensate in the evaporation space, and effecting a gauging of the resulting vapor pressure in said sealed-off evaporation space as being directly proportional to the mass of the moisture derived from the sample.

4. In apparatus for ascertaining the moisture content of a sample of material of known weight while the sample temperature is maintained at a normal value for the material, means providing a closed evaporation space, means for substantially exhausting said space of fluid, a means including a valve connecting said evaporation space with the sample and openable for the vapor pressure evaporation of the moisture from the sample into the exhausted evaporation space, a cooling means operative with respect to the vapor in the connected evaporation space while said valve is open to condense the received vapor in said space, a heating means operative after said valve is closed to evaporate the condensate in said space to provide a vapor pressure therein which is directly proportional to the mass of moisture evaporated from the sample, and a means for indicating said vapor pressure.

5. In apparatus for ascertaining the moisture content of a sample of material of known weight while the sample temperature is maintained at a normal value for the material, a vapor-pressure indicator, means providing a closed evaporation space including a sealed-in operating connection for said indicator, means for substantially exhausting said space of fluid, means including a valve connecting said evaporation space with the sample for the vapor pressure evaporation of the moisture from the sample into the exhausted evaporation space, a heat-exchange cooling means operative with respect to the vapor in said closed evaporation space by cooling it while said valve is open to condense the vapor in said space and a heat-exchange heating means operative after said valve is closed to evaporate the condensate in said space by heating it to provide in the space a vapor pressure which is directly proportional to the mass of moisture evaporated from the sample and which is directly measured by the indicator.

6. The structure of claim 5 wherein the vapor pressure indicator includes a liquid-charged U-tube manometer having one leg thereof sealedly connected with the evaporation space.

References Cited in the file of this patent

UNITED STATES PATENTS

| | | |
|---|---|---|
| 1,858,409 | Mittelsteiner | May 17, 1932 |
| 2,075,326 | Zimmerli | Mar. 30, 1937 |
| 2,169,812 | Palkin et al. | Aug. 15, 1939 |
| 2,277,760 | Hoffman et al. | Mar. 31, 1942 |
| 2,379,045 | Sturgis | June 26, 1945 |
| 2,395,536 | Crawford et al. | Feb. 26, 1946 |
| 2,438,228 | Osten | Mar. 23, 1948 |
| 2,509,327 | Young | May 30, 1950 |
| 2,692,497 | Van Nordstrand | Oct. 26, 1954 |